US011982243B2

(12) United States Patent
Sato

(10) Patent No.: US 11,982,243 B2
(45) Date of Patent: May 14, 2024

(54) INTERNAL COMBUSTION ENGINE CONTROLLER AND CONTROL METHOD

(71) Applicant: TOYOTA JIDOSHA KABUSHIKI KAISHA, Aichi-ken (JP)

(72) Inventor: Keiichi Sato, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/301,254

(22) Filed: Apr. 17, 2023

(65) Prior Publication Data

US 2023/0332550 A1 Oct. 19, 2023

(30) Foreign Application Priority Data

Apr. 19, 2022 (JP) ................................. 2022-069003

(51) Int. Cl.
*F02M 26/66* (2016.01)
*F02D 41/00* (2006.01)
*F02M 26/68* (2016.01)
*F02M 26/72* (2016.01)

(52) U.S. Cl.
CPC ....... *F02D 41/0077* (2013.01); *F02D 41/005* (2013.01); *F02M 26/68* (2016.02); *F02M 26/72* (2016.02); *F02D 2200/70* (2013.01)

(58) Field of Classification Search
CPC ...... F02D 41/064; F02D 41/06; F02D 41/062; F02D 41/0077; F02D 41/0065; F02D 41/0047; F02D 41/005; F02D 2200/021; F02D 2200/0414; F02M 26/66
See application file for complete search history.

(56) References Cited

U.S. PATENT DOCUMENTS

2008/0017175 A1* 1/2008 Kondo ................ F01N 13/0097 700/274
2014/0298801 A1* 10/2014 Akita ..................... F02M 26/35 60/602
2014/0366853 A1 12/2014 Ichihara
2021/0123397 A1 4/2021 Itoh et al.

FOREIGN PATENT DOCUMENTS

CN 101595289 A * 12/2009 ............. F02D 21/08
CN 104929784 A * 9/2015
CN 110630412 A * 12/2019

(Continued)

*Primary Examiner* — George C Jin
*Assistant Examiner* — Teuta B Holbrook
(74) *Attorney, Agent, or Firm* — HAUPTMAN HAM, LLP

(57) ABSTRACT

A controller is used in an internal combustion engine provided with an EGR device recirculating some of exhaust gas flowing in an exhaust passage to an intake passage as EGR gas. The EGR device includes an EGR passage and an EGR valve. The controller includes a CPU that controls opening and closing of the EGR valve. The CPU executes determining process of determining whether the temperature of the internal combustion engine is about the same as the outside air temperature, and an axis displacement eliminating process of opening and closing the EGR valve when it is determined that the temperature of the internal combustion engine is about the same as the outside air temperature in the determining process during the operation stop of the internal combustion engine.

19 Claims, 4 Drawing Sheets

(56) References Cited

FOREIGN PATENT DOCUMENTS

| | | | | | |
|---|---|---|---|---|---|
| CN | 111120157 | A | * | 5/2020 | |
| CN | 108953008 | B | * | 2/2021 | ......... F02D 41/0077 |
| DE | 102012105001 | B4 | * | 12/2019 | ........... F02D 41/123 |
| JP | 2000179707 | A | * | 6/2000 | |
| JP | 2010043538 | A | * | 2/2010 | |
| JP | 2014202137 | A | * | 10/2014 | ........... F02D 41/005 |
| JP | 2014240631 | A | | 12/2014 | |
| JP | 2015175330 | A | | 10/2015 | |
| JP | 2018087539 | A | * | 6/2018 | |
| JP | 6451812 | B1 | * | 1/2019 | |
| JP | 2021067230 | A | | 4/2021 | |
| WO | WO-2004022940 | A1 | * | 3/2004 | .............. F01P 7/165 |

* cited by examiner

INTERNAL COMBUSTION ENGINE CONTROLLER AND CONTROL METHOD

RELATED APPLICATIONS

The present application claims priority of Japanese Application Number 2022-069003 filed on Apr. 19, 2022, the disclosure of which is hereby incorporated by reference herein in its entirety.

BACKGROUND

1. Field

The present disclosure relates to an internal combustion engine controller and a control method.

2. Description of Related Art

Japanese Laid-Open Patent Publication No. 2014-240631 discloses a controller that controls an EGR device of an internal combustion engine. The EGR device includes an EGR passage and an electronically controlled EGR valve provided in the EGR passage. A first end of the EGR passage is connected to a portion of the exhaust passage upstream of the turbine of a forced-induction device, while a second end of the EGR passage is connected to a portion of the intake passage downstream of the throttle valve.

When an EGR gas leakage amount, which is an amount of EGR gas flowing in the intake passage when the EGR valve is closed, is equal to or larger than a predetermined amount, the controller repeatedly performs opening and closing operations of the EGR valve multiple times when the operation of the internal combustion engine is stopped.

In general, the EGR valve includes a metal valve housing having an EGR passage formed therein, a valve seat provided in the valve housing, and a valve member. The valve member is supported by the valve housing so as to be movable in a separating direction in which the valve member is separated from the valve seat and in an approaching direction which is opposite to the separating direction and is a direction in which the valve member approaches the valve seat. Such an EGR valve allows passage of EGR gas by separating the valve member from the valve seat when the valve is opened. When the EGR valve is closed, the valve member is pressed against the valve seat to restrict the passage of the EGR gas.

Such an EGR valve is assembled such that the central axis of the valve seat substantially coincides with the central axis of the valve member. However, during the operation of the internal combustion engine, high-temperature EGR gas flows through the EGR passage. That is, the EGR valve is exposed to the high-temperature EGR gas. As a result, the valve housing supporting the valve member may be thermally deformed, and the central axis of the valve member may be displaced relative to the central axis of the valve seat. When the EGR valve is closed when the central axis of the valve member is displaced relative to the central axis of the valve seat as described above, the valve member is pressed against the valve seat with the central axis of the valve member displaced relative to the central axis of the valve seat. In this case, even when the EGR valve is closed, a relatively large gap is formed between the valve seat and the valve member. In this state, even when the valve housing is cooled and the thermal deformation of the valve housing is eliminated, a frictional force is generated between the valve seat and the valve member, and thus a state is maintained in which the central axis of the valve member is displaced relative to the central axis of the valve seat. That is, a relatively large gap remains between the valve seat and the valve member. As a result, even though the EGR valve is closed, the amount of EGR gas leaking into the intake passage via the EGR valve becomes relatively large.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an internal combustion engine controller for an internal combustion engine is provided. The internal combustion engine includes an intake passage, an exhaust passage, and an EGR device that recirculates some of exhaust gas flowing through the exhaust passage to the intake passage as EGR gas. The EGR device includes an EGR passage including a first end connected to the exhaust passage and a second end connected to the intake passage, and an EGR valve provided in the EGR passage. The EGR valve includes a metal valve housing in which the EGR passage is formed, a valve seat provided in the valve housing, a valve member supported by the valve housing so as to be movable in a separating direction away from the valve seat and an approaching direction opposite to the separating direction and approaching the valve seat, and an actuator that operates to move the valve member in the separating direction and the approaching direction. The EGR valve is configured to restrict the flow of the EGR gas in the EGR passage by pressing the valve member against the valve seat when the EGR valve is closed, and to allow the flow of the EGR gas in the EGR passage by separating the valve member from the valve seat when the EGR valve is opened. The internal combustion engine controller includes processing circuitry configured to control the EGR valve by operating the actuator. The processing circuitry is configured to execute determining process of determining whether a temperature of the internal combustion engine is substantially equal to an outside air temperature, and an axis displacement eliminating process of causing the EGR valve to perform an opening/closing operation when it is determined in the determining process that the temperature of the internal combustion engine is substantially equal to the outside air temperature during a stopped state of the internal combustion engine.

In another general aspect, a method for controlling an internal combustion engine is provided. The internal combustion engine includes an intake passage, an exhaust passage, and an EGR device that recirculates some of exhaust gas flowing through the exhaust passage to the intake passage as EGR gas. The EGR device includes an EGR passage including a first end connected to the exhaust passage and a second end connected to the intake passage, and an EGR valve provided in the EGR passage. The EGR valve includes a metal valve housing in which the EGR passage is formed, a valve seat provided in the valve housing, a valve member supported by the valve housing so as to be movable in a separating direction away from the valve seat and an approaching direction opposite to the separating direction and approaching the valve seat, and an actuator that operates to move the valve member in the separating direction and the approaching direction. The EGR valve is configured to restrict the flow of the EGR gas in the EGR passage by pressing the valve member against the valve seat when the EGR valve is closed, and to allow the flow of the EGR gas in the EGR passage by separating the valve member from the valve seat when the EGR valve is opened. The internal combustion engine control method includes determining whether a temperature of the internal combustion engine is substantially equal to an outside air temperature, and causing the EGR valve to perform an opening/closing operation when it is determined in the determining process that the temperature of the internal combustion engine is substantially equal to the outside air temperature during a stopped state of the internal combustion engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an internal combustion engine controller according to one embodiment will be described with reference to FIGS. 1 to 6.

Figure 1:
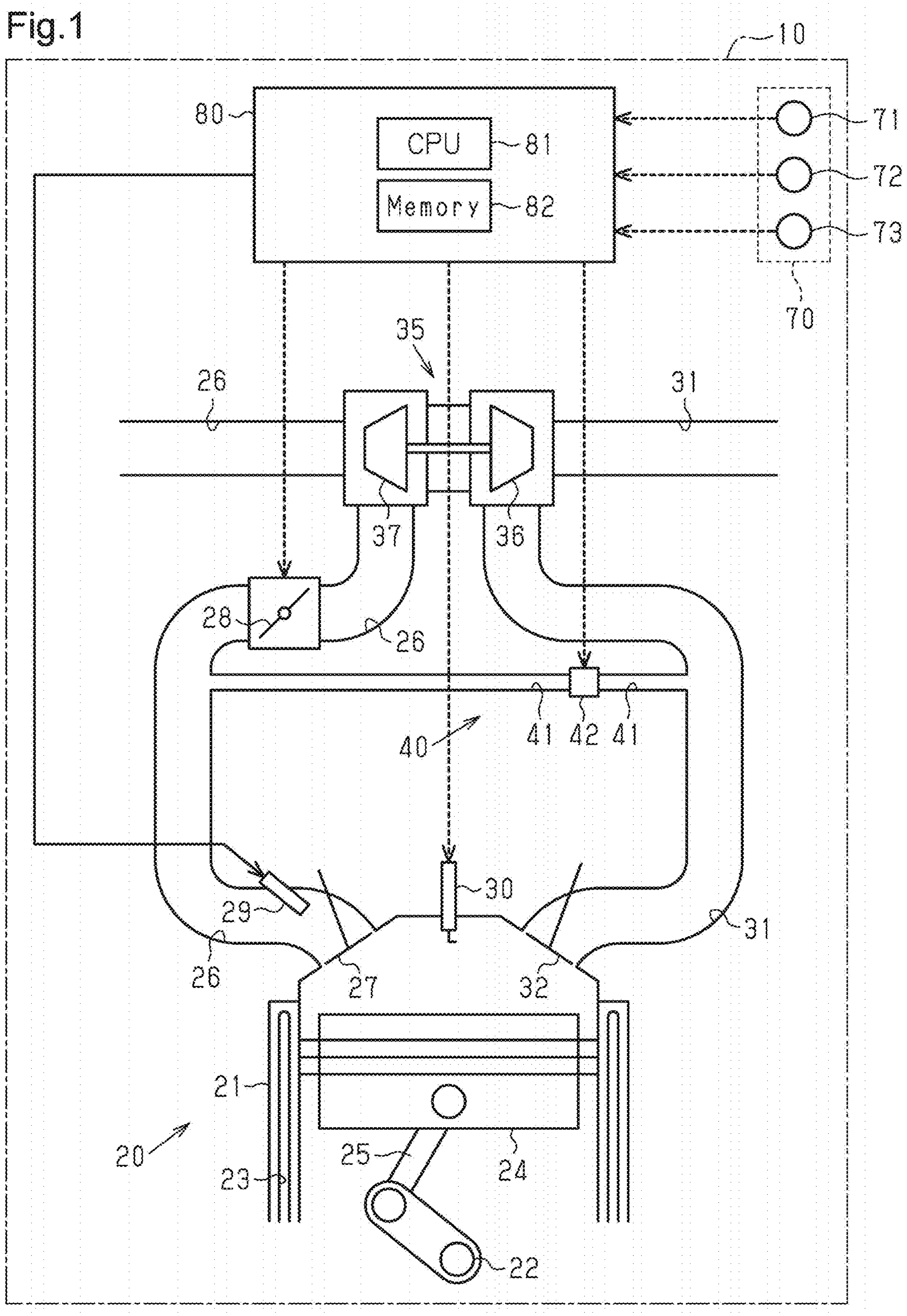
FIG. 1 is a configuration diagram schematically showing a vehicle provided with an internal combustion engine controller.

A vehicle 10 shown in FIG. 1 includes an internal combustion engine 20, a detection system 70, and a controller 80 that controls the operation of the internal combustion engine 20. The controller 80 corresponds to an internal combustion engine controller.

<Internal Combustion Engine>

The internal combustion engine 20 includes cylinders 21 and a crankshaft 22. In FIG. 1, only one of the cylinders 21 is illustrated. The internal combustion engine 20 includes a water jacket 23, through which coolant for cooling the cylinders 21 flows. A piston 24 that reciprocates in the cylinder 21 is provided in each cylinder 21. The piston 24 is connected to the crankshaft 22 via a connecting rod 25. As the pistons 24 reciprocate in the cylinders 21, the crankshaft 22 rotates.

The internal combustion engine 20 includes an intake passage 26, an intake valve 27, and an electronically controlled throttle valve 28. The intake passage 26 is a passage through which air to be introduced into the cylinders 21 flows. The air flowing through the intake passage 26 is introduced into the cylinder 21 when the intake valve 27 is opened. The throttle valve 28 adjusts an intake air amount that is an amount of air flowing through the intake passage 26.

The internal combustion engine 20 includes fuel injection valves 29, ignition devices 30, an exhaust passage 31, and exhaust valves 32. The fuel injection valve 29 injects fuel to be supplied into the cylinder 21. In the cylinder 21, an air-fuel mixture containing air introduced from the intake passage 26 and fuel injected from the fuel injection valve 29 is combusted by ignition of the ignition device 30. The piston 24 is reciprocated in the cylinder 21 by force obtained by combustion of the air-fuel mixture. Further, exhaust gas is generated by combustion of the air-fuel mixture in the cylinder 21. The exhaust gas is discharged from the cylinder 21 to the exhaust passage 31 when the exhaust valve 32 is opened.

The internal combustion engine 20 includes an exhaust-driven forced-induction device 35. The forced-induction device 35 includes a turbine 36 and a compressor 37. The turbine 36 is provided in the exhaust passage 31. The compressor 37 is provided in a portion of the intake passage 26 upstream of the throttle valve 28. The turbine 36 is driven by the flow force of the exhaust gas flowing through the exhaust passage 31. The compressor 37 is driven in synchronization with the driving of the turbine 36. When the turbine 36 is driven, air flowing through the intake passage 26 is pressurized and introduced into the cylinder 21.

The internal combustion engine 20 includes an EGR device 40. The EGR device 40 is a device that recirculates a portion of the exhaust gas flowing through the exhaust passage 31 to the intake passage 26 as EGR gas. The EGR device 40 includes an EGR passage 41 and an electronically controlled EGR valve 42 provided in the EGR passage 41. A first end of the EGR passage 41 is connected to the exhaust passage 31, while a second end of the EGR passage 41 is provided in the intake passage 26. Specifically, the first end of the EGR passage 41 is connected to a portion of the exhaust passage 31 upstream of the turbine 36. The second end of the EGR passage 41 is connected to a portion of the intake passage 26 downstream of the throttle valve 28.

Figure 2:
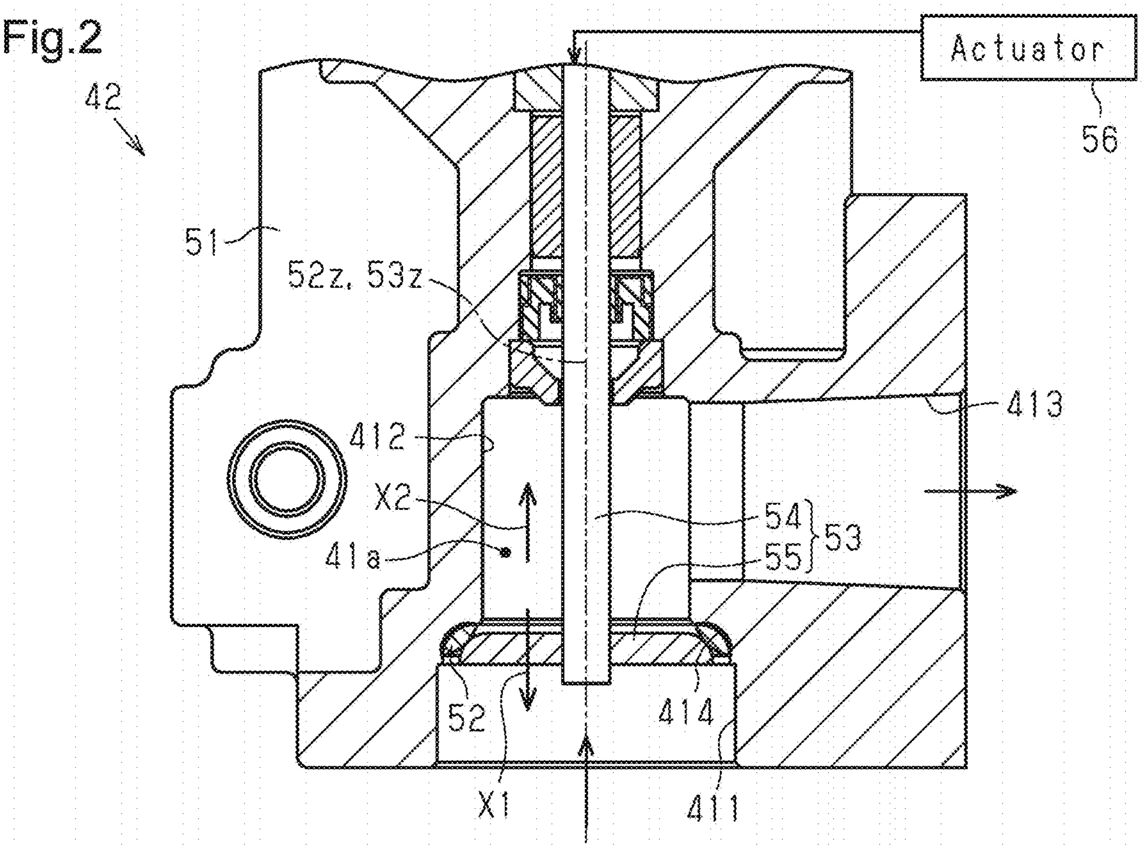
FIG. 2 is a cross-sectional view showing an EGR valve in an EGR device provided in the internal combustion engine.
Figure 3:
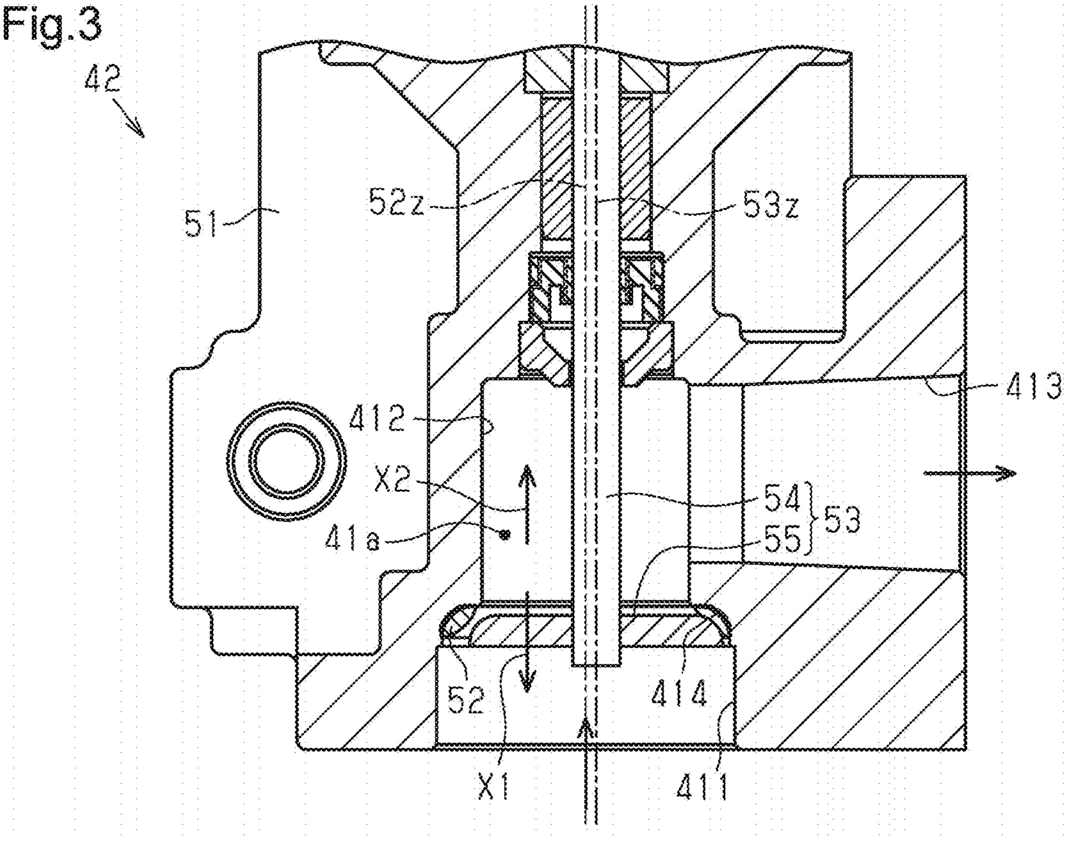
FIG. 3 is a cross-sectional view schematically showing a state in which a central axis of a valve member is displaced relative to a central axis of a valve seat in the EGR valve.

The EGR valve 42 will be described in detail with reference to FIGS. 2 and 3.

The EGR valve 42 includes a metal valve housing 51, a valve seat 52, a valve member 53, and an actuator 56.

The valve housing 51 is made of, for example, aluminum or an aluminum alloy. The EGR passage 41 extends through the valve housing 51. That is, the EGR passage 41 is formed in the valve housing 51. A portion of the EGR passage 41 formed in the valve housing 51 is referred to as an in-housing passage 41*a*. When the EGR valve 42 is opened, the EGR gas flows through the in-housing passage 41*a* in a direction indicated by an arrow in FIG. 2.

The in-housing passage 41*a* includes an upstream end portion 411, an intermediate portion 412, and a downstream end portion 413. The intermediate portion 412 is located between the upstream end portion 411 and the downstream end portion 413 in the flowing direction of the EGR gas in the in-housing passage 41*a*. In other words, the intermediate portion 412 is connected to both the upstream end portion 411 and the downstream end portion 413. Since the diameter of the upstream end portion 411 is larger than the diameter of the intermediate portion 412, a step 414 is formed at the boundary between the upstream end portion 411 and the intermediate portion 412.

The valve seat 52 is disposed on the step 414. The valve seat 52 has an annular shape. For example, the valve seat 52 is provided in the valve housing 51 by laser cladding. When the EGR valve 42 is open, the EGR gas passes through the inner side of the valve seat 52.

The valve member 53 includes a shaft 54 and a valve main body 55 fixed to the shaft 54. The shaft 54 is supported to be movable forward and backward with respect to the valve housing 51. The valve main body 55 is configured to be in contact with the entire circumference of the valve seat 52. In the present embodiment, the EGR valve 42 is designed such that a central axis 52*z* of the valve seat 52 substantially coincides with a central axis 53*z* of the shaft 54 of the valve member 53. The state in which the two central axes 52*z* and 53*z* substantially coincide with each other includes not only a case in which the two central axes 52*z* and 52*z* completely overlap with each other as shown in FIG. 2, but also a case in which the two central axes 52*z* and 52*z* are slightly deviated from each other within a range of manufacturing errors. Hereinafter, the central axis 53*z* of the shaft 54 of the valve member 53 will simply be referred to as a central axis 53*z* of the valve member 53.

The valve member 53 is movable in a separating direction X1 and in an approaching direction X2 opposite to the separating direction X1. When the valve member 53 is moved in the separating direction X1, the valve main body 55 is separated from the valve seat 52, so that the EGR valve 42 is opened. When the EGR valve 42 is opened in this way, the EGR valve 42 allows the EGR gas to flow through the EGR passage 41 toward the intake passage 26. On the other hand, when the valve member 53 moves in the approaching direction X2, the valve main body 55 is pressed against the valve seat 52, so that the EGR valve 42 is closed. When the EGR valve 42 is closed in this way, the EGR valve 42 restricts the EGR gas from flowing through the EGR passage 41 toward the intake passage 26.

The actuator 56 operates in response to a command from the controller 80. When the actuator 56 is actuated, the output of the actuator 56 is transmitted to the valve member 53, whereby the valve member 53 moves in the separating direction X1. Therefore, the EGR valve 42 is opened. On the other hand, when the operation of the actuator 56 is stopped, the output of the actuator 56 is not transmitted to the valve member 53. Therefore, the valve member 53 moves in the approaching direction X2, and the valve member 53 is pressed against the valve seat 52. As a result, the EGR valve 42 is closed.

When the EGR valve 42 is opened while the internal combustion engine 20 is in operation, high-temperature EGR gas flows through the EGR passage 41. That is, the valve housing 51 is exposed to the high-temperature EGR gas. When the valve housing 51 receives heat, the valve housing 51 is thermally deformed. Since the shaft 54 of the valve member 53 is supported by the housing 51, when the housing 51 is thermally deformed, the central axis 53*z* of the valve member 53 may be displaced relative to the central axis 52*z* of the valve seat 52 as shown in FIG. 3. When the EGR valve 42 is closed in a state in which the central axis 53*z* of the valve member 53 and the central axis 52*z* of the valve seat 52 are displaced relative to each other, a relatively large clearance may be formed between the valve seat 52 and the valve main body 55.

<Detection System>

As shown in FIG. 1, the detection system 70 includes various types of sensors. The various types of sensors output signals corresponding to detection results to the controller 80. The detection system 70 includes a coolant temperature sensor 71, an outside air temperature sensor 72, and an odometer 73 as sensors. The coolant temperature sensor 71 detects a coolant temperature, which is a temperature of the coolant circulating in the internal combustion engine 20, that is, the coolant flowing through the water jacket 23. The outside air temperature sensor 72 detects an outside air temperature of the vehicle 10. The odometer 73 detects a cumulative traveled distance, which is a cumulative value of the traveled distance of the vehicle 10. In the following description, the coolant temperature detected by the coolant temperature sensor 71 will be referred to as a coolant temperature TPw, the outside air temperature detected by the outside air temperature sensor 72 is referred to as an outside air temperature tPo, and the cumulative traveled distance detected by the odometer 73 is referred to as a cumulative traveled distance La.

<Controller>

The controller 80 adjusts the opening degree of the throttle valve 28, the fuel injection amount of the fuel injection valve 29, and the ignition timing of the ignition device 30 based on the detection values of the various types of sensors 71 to 73. Further, the controller 80 controls opening and closing of the EGR valve 42 by operating the actuator 56 of the EGR valve 42.

The controller 80 includes a CPU 81 and a memory 82. The memory 82 stores various control programs to be executed by the CPU 81. In the present embodiment, the CPU 81 corresponds to an execution device.

The CPU 81 executes a determining process and an axis displacement eliminating process.

The determining process is a process of determining whether or not the temperature of the internal combustion engine 20 is substantially equal to the outside air temperature. For example, in the determining process, the CPU 81 determines whether or not the temperature of the engine 20 is substantially equal to the outside air temperature based on the coolant temperature TPw. At this time, when the coolant temperature TPw is equal to or lower than a determination temperature TPwth, the CPU 81 determines that the temperature of the engine 20 is substantially equal to the outside air temperature. On the other hand, when the coolant temperature TPw is higher than the determination temperature TPwth, the CPU 81 determines that the temperature of the engine 20 is not substantially equal to the outside air temperature. The determination temperature TPwth is set as a criterion for determining whether or not the coolant temperature TPw is equal to the outside air temperature.

The axis displacement eliminating process is a process executed when it is determined in the determining process that the temperature of the internal combustion engine 20 is substantially equal to the outside air temperature with the internal combustion engine 20 being a stopped state. In the axis displacement eliminating process, the CPU 81 opens and closes the EGR valve 42. In the present embodiment, the CPU 81 opens and closes the EGR valve 42 only once in the axis displacement eliminating process. The number of the opening and closing operations of the EGR valve 42 accompanying the execution of the axis displacement eliminating process may be two or more.

Figure 4:
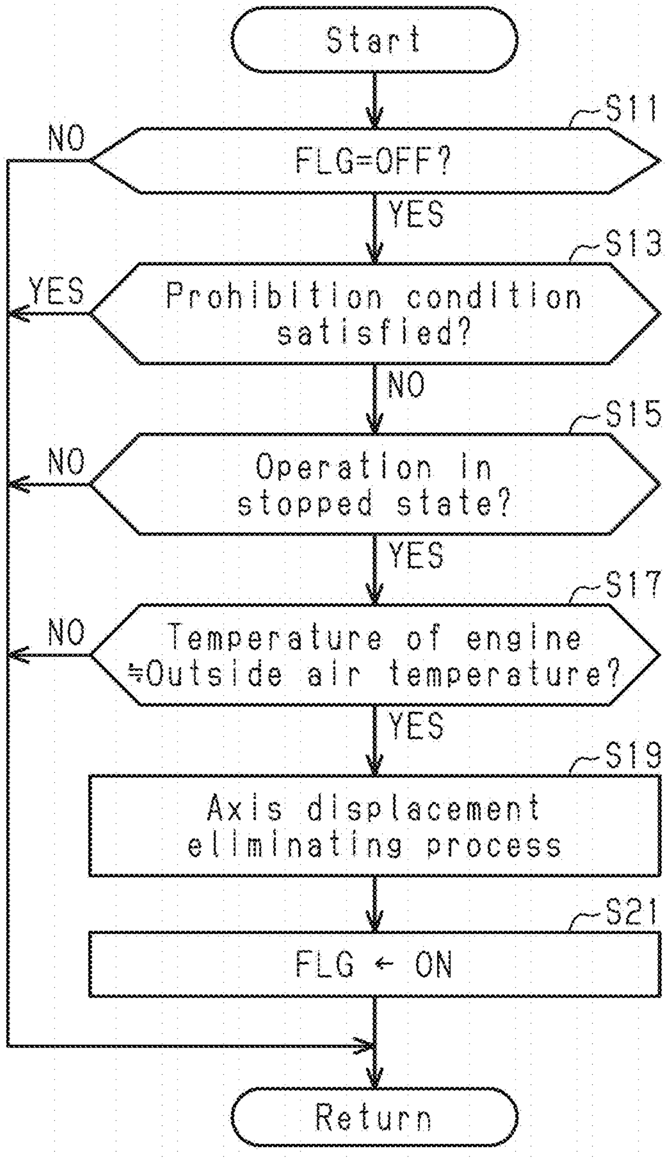
FIG. 4 is a flowchart showing a processing routine executed by a CPU of the internal combustion engine controller.

With reference to FIG. 4, a description will be given of a processing routine executed by the CPU 81 in order to eliminate the displacement between the central axis 52*z* of the valve seat 52 and the central axis 53*z* of the valve member 53 in the EGR valve 42. When the CPU 81 repeatedly executes the control program stored in the memory 82, the present processing routine is executed at every predetermined control cycle.

In step S11 of this processing routine, CPU 81 determines whether an execution completion flag FLG is set to OFF. The execution completion flag FLG is set to ON when the axis displacement eliminating process has been executed, and is set to OFF when the axis displacement eliminating process has not been executed yet. When the operation of the internal combustion engine 20 is started, the execution completion flag FLG is set to OFF. When the executed flag FLG is set to OFF (S11: YES), the CPU 81 advances the process to step S13. When the execution completion flag FLG is set to ON (S11: NO), the CPU 81 temporarily ends this processing routine.

In step S13, the CPU 81 determines whether a prohibition condition of the axis displacement eliminating process is satisfied. For example, the CPU 81 determines that the prohibition condition is satisfied when the cumulative traveled distance La is equal to or greater than a determination distance Lath, and determines that the prohibition condition is not satisfied when the cumulative traveled distance La is less than the determination distance Lath.

Figure 5:
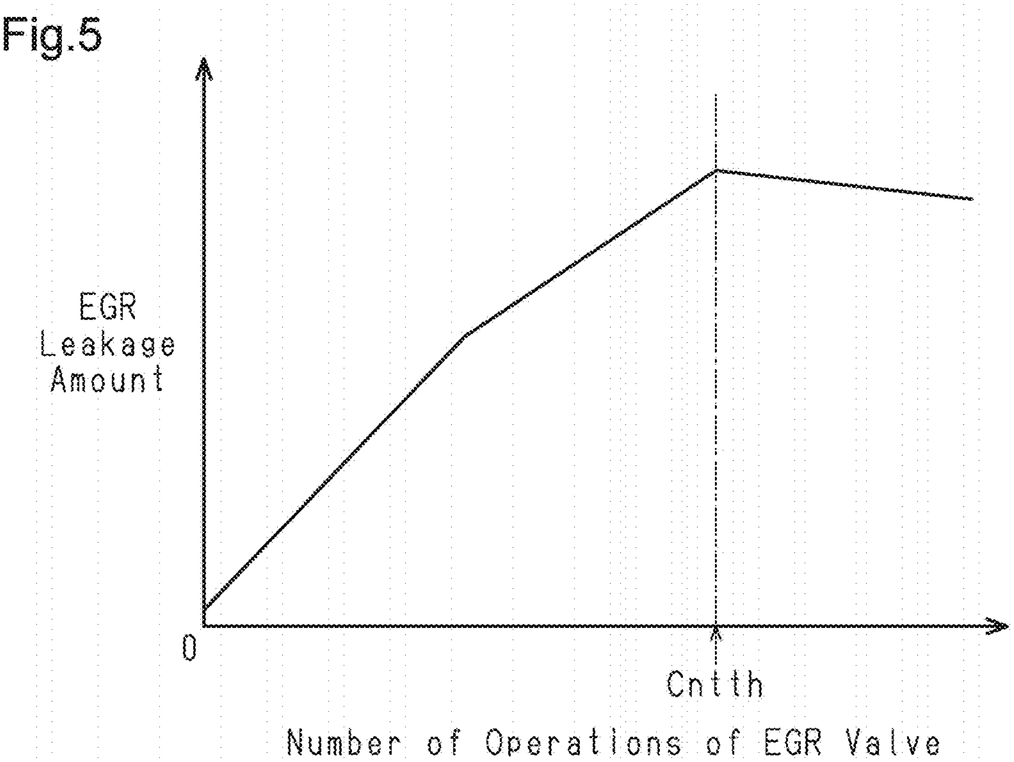
FIG. 5 is a graph showing an example of an experimental result of a relationship between a leakage amount of EGR gas to the intake passage via the EGR valve and the number of operations of the EGR valve.

The reason why the prohibition condition is provided will be described with reference to FIG. 5. FIG. 5 is a graph showing an experimental result of a relationship between the number of operations of the EGR valve 42 and the EGR leakage amount. The number of operations referred to here is the number of opening and closing operations of the EGR valve 42. The EGR leakage amount referred to here is the amount of EGR gas that leaks into the intake passage 26 via the EGR valve 42 with the internal combustion engine 20 in a stopped state. When the number of operations is small, the amount of EGR leakage increases as the number of operations increases. As the EGR valve 42 is opened and closed many times, wear of the valve seat 52 and the valve main body 55 of the valve member 53 gradually progresses. Therefore, it is estimated that the EGR leakage amount increases. However, after the number of operations exceeds a determination count Cntth, the EGR leakage amount decreases as the number of operations increases. This is because the valve seat 52 has worn to match the shape of the valve main body 55, resulting in a reduction in the formation of gaps between the valve seat 52 and the valve main body 55 even if the central axis 53*z* of the valve member 53 remains displaced relative to the central axis 52*z* of the valve seat 52 when the EGR valve 42 is closed. This is presumed to be due to the progress of wear on the valve seat 52 and the valve main body 55.

Therefore, in the present embodiment, the cumulative value of the traveled distance of the vehicle 10, which corresponds to the determination count Cntth is set as the determination distance Lath. Therefore, when the cumulative traveled distance La is equal to or greater than the determination distance Lath, it is considered that there is a possibility that the effect of reducing the EGR leakage amount by executing the axis displacement eliminating process is not high. That is, when the cumulative traveled distance La is equal to or longer than the determination distance Lath, it is determined that the prohibition condition of the axis displacement eliminating process is satisfied because the advantage of executing the axis displacement eliminating process is small.

Returning to step S13 of FIG. 4, when it is determined that the prohibition condition is satisfied (S13: YES), the CPU 81 temporarily ends this processing routine. On the other hand, when it is determined that the prohibition condition is not satisfied (S13: NO), the CPU 81 advances the process to step S15.

In step S15, the CPU 81 determines whether the operation of the engine 20 is stopped. When the operation of the engine 20 is stopped (S15: YES), the CPU 81 advances the process to step S17. On the other hand, when the engine 20 is in operation (S15: NO), the CPU 81 temporarily ends this processing routine.

In step S17, the CPU 81 determines whether the temperature of the engine 20 is substantially equal to the outside air temperature. That is, step S17 corresponds to a determining process. When it is determined that the temperature of the engine 20 is substantially equal to the outside air temperature (S17: YES), the CPU 81 advances the process to step S19. On the other hand, when it is determined that the temperature of the engine 20 is not substantially equal to the outside air temperature (S17: NO), the CPU 81 temporarily ends the present processing routine.

In step S19, the CPU 81 executes an axis displacement eliminating process. That is, when it is determined that the temperature of the internal combustion engine 20 is substantially equal to the outside air temperature with the internal combustion engine 20 being in a stopped state, the CPU 81 executes the axis displacement eliminating process. When the opening and closing operation of the EGR valve 42 associated with the execution of the axis displacement eliminating process is completed, the CPU 81 advances the process to step S21.

In step S21, the CPU 81 sets the execution completion flag FLG to ON. Thereafter, the CPU 81 temporarily terminates this processing routine.

<Operation and Advantages of Present Embodiment>

Figure 6:
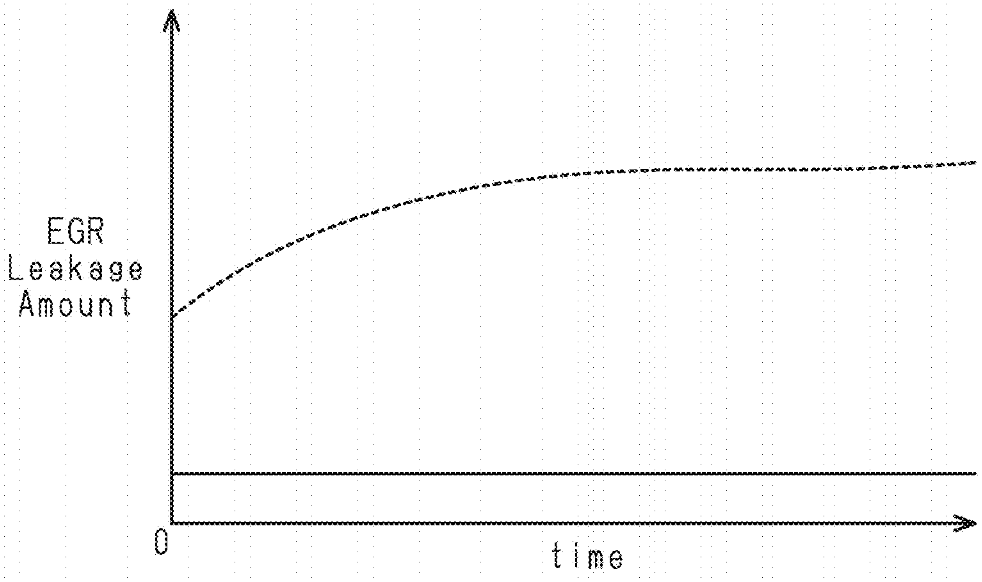
FIG. 6 is a graph of an example of an experimental result, showing transition of a leakage amount of EGR gas to the intake passage via the EGR valve.

FIG. 6 is a graph showing experimental results of transition of the EGR leakage amount. The EGR leakage amount referred to here is the amount of EGR gas that leaks into the intake passage 26 via the EGR valve 42 with the internal combustion engine 20 in a stopped state. The solid line in FIG. 6 shows the transition of the EGR leakage amount when the EGR valve 42 is closed when the temperature of the internal combustion engine 20 is about the same as the room temperature. The broken line in FIG. 6 shows the transition of the EGR leakage amount when the EGR valve 42 is closed when the temperature of the internal combustion engine 20 is higher than the room temperature.

As shown in FIG. 6, when the EGR valve 42 is closed under the condition that the temperature of the engine 20 is relatively high, the central axis 52*z* of the valve seat 52 and the central axis 53*z* of the valve member 53 are displaced relative to each other, so that the gap between the valve seat 52 and the valve main body 55 is relatively large. On the other hand, when the EGR valve 42 is closed under the condition that the temperature of the engine 20 is substantially equal to the room temperature, the central axis 52*z* of the valve seat 52 and the central axis 53*z* of the valve member 53 are not significantly displaced relative to each other, so that the gap between the valve seat 52 and the valve main body 55 is relatively narrow. Therefore, in a case in which the EGR valve 42 is closed in a situation in which the temperature of the internal combustion engine 20 is relatively high, the EGR leakage amount is larger than that in a case in which the EGR valve 42 is closed in a situation in which the temperature of the internal combustion engine 20 is substantially equal to the room temperature.

Immediately after the operation of the internal combustion engine 20 is stopped, the temperature of the valve housing 51 of the EGR valve 42 is relatively high, and the degree of thermal deformation of the valve housing 51 is relatively large. Therefore, even if the EGR valve 42 is opened and closed immediately after stopping the operation of the engine 20, the displacement between the central axis 52*z* of the valve seat 52 and the central axis 53*z* of the valve member 53 cannot be eliminated. However, since the temperature of the internal combustion engine 20 gradually decreases as time elapses from the time point when the operation of the internal combustion engine 20 is stopped, the temperature of the valve housing 51 also decreases. When the temperature of the valve housing 51 decreases, the degree of thermal deformation of the valve housing 51 also decreases. That is, the shape of the valve housing 51 returns to the original shape.

Therefore, in the present embodiment, when it is determined that the temperature of the internal combustion engine 20 has decreased to the same level as the outside air temperature after the operation of the internal combustion engine 20 is stopped, the axis displacement eliminating process is executed. That is, after the temperature of the valve housing 51 is sufficiently lowered and the degree of thermal deformation of the valve housing 51 becomes sufficiently small, the axis displacement eliminating process is executed. When the EGR valve 42 is opened and closed after the valve housing 51 returns to its original shape, the displacement between the central axis 52*z* of the valve seat 52 and the central axis 53*z* of the valve member 53 is eliminated while the valve main body 55 is separated from the valve seat 52. Since the valve main body 55 is pressed against the valve seat 52 in this state, the gap between the valve seat 52 and the valve main body 55 is reduced. Thus, the amount of EGR gas leaking into the intake passage 26 via the EGR valve 42 is reduced. That is, after the execution of the axis displacement eliminating process, the EGR leakage amount shown in FIG. 6 can be made substantially equal to the EGR leakage amount in the case in which the EGR valve 42 is closed in the situation in which the temperature of the internal combustion engine 20 is substantially equal to the room temperature.

In the present embodiment, the following advantages are obtained.

(1) When the EGR valve 42 is closed in a state in which the degree of thermal deformation of the housing 51 is large, the central axis 52*z* of the valve seat 52 and the central axis 53*z* of the valve member 53 are displaced relative to each other as described above. When the central axis 52*z* of the valve seat 52 is displaced from the central axis 53*z* of the valve member 53 even after the temperature of the valve housing 51 becomes sufficiently low and the thermal deformation of the valve housing 51 is eliminated, an external force acts on the shaft 54 supported by the valve housing 51. Therefore, if a state in which the central axis 52*z* of the valve seat 52 is displaced from the central axis 53*z* of the valve member 53 continues for a long period of time, the shaft 54 may be deformed. In this regard, in the present embodiment, when the temperature of the valve housing 51 becomes sufficiently low and the degree of thermal deformation of the valve housing 51 becomes sufficiently small, the relative displacement between the central axis 52*z* of the valve seat 52 and the central axis 53*z* of the valve member 53 is eliminated by executing the axis displacement eliminating process. This reduces the external force acting on the shaft 54, so that deformation of the shaft 54 while the EGR valve 42 is closed is suppressed.

(2) In the present embodiment, the coolant temperature TPw, which is the temperature of the coolant circulating in the internal combustion engine 20, is used to determine whether the temperature of the internal combustion engine 20 has become substantially equal to the outside air temperature. That is, a detection system for detecting the temperature of the valve housing 51 or detecting the degree of deformation of the valve housing 51 does not need to be newly provided in the internal combustion engine 20.

(3) In the present embodiment, when the cumulative traveled distance La becomes equal to or greater than the determination distance Lath, it can be determined that the advantage of executing the axis displacement eliminating process has decreased, and therefore, the execution of the axis displacement eliminating process is prohibited. Thus, the amount of electric power consumed by the internal combustion engine 20 in a stopped state is reduced.

Modifications

The above-described embodiment can be modified as follows. The above-described embodiment and the following modifications can be combined with each other as long as there is no technical contradiction.

In step S13 of the processing routine shown in FIG. 4, it may be determined whether the prohibition condition is satisfied using the cumulative value of the number of operations of the EGR valve 42. In this case, it may be determined that the prohibition condition is satisfied when the cumulative value of the number of operations of the EGR valve 42 is equal to or larger than the determination count Cntth, and it may be determined that the prohibition condition is not satisfied when the cumulative value of the number of operations is smaller than the determination count Cntth. Thus, when the cumulative value of the number of operations of the EGR valve 42 is equal to or larger than the determination count Cntth, the execution of the axis displacement eliminating process is prohibited. Even in this case, it is possible to obtain an advantage equivalent to the advantage (3) of the above-described embodiment.

In the processing routine shown in FIG. 4, the process of step S13 may be omitted.

The determination temperature TPwth may be fixed at a specified temperature, or the determination temperature TPwth may be varied according to the outside air temperature at that time. In this case, the detection temperature TPwth is desirably set to a higher temperature as the outside air temperature TPo increases.

In the above embodiment, the coolant temperature TPw, which is the temperature of the coolant circulating in the internal combustion engine 20, is used to determine whether the temperature of the internal combustion engine 20 has become substantially equal to the outside air temperature. However, the present disclosure is not limited to this. For example, whether the temperature of the internal combustion engine 20 has become substantially the same as the outside air temperature may be determined using the duration of the state in which the operation of the internal combustion engine 20 is in a stopped state. In this case, when the duration is equal to or longer than a specified determination duration, it may be determined that the temperature of the internal combustion engine 20 has become substantially equal to the outside air temperature.

The controller 80 is not limited to a device including processing circuitry that includes a CPU and a ROM and executes software processing. That is, the controller 80 may be modified if it has any one of the following configurations (a) to (c).

(a) The controller 80 includes one or more processors that execute various processes according to computer programs. The processor includes a CPU and a memory such as RAM and ROM. The memory stores program codes or instructions configured to cause the CPU to execute processes. The memory, which is a computer-readable medium, includes any type of media that are accessible by general-purpose computers and dedicated computers.

(b) The controller 80 includes one or more dedicated hardware circuits that execute various processes. The dedicated hardware circuits include, for example, an application specific integrated circuit (ASIC) and a field programmable gate array (FPGA).

(c) The controller 80 includes a processor that executes part of various processes according to programs and a dedicated hardware circuit that executes the remaining processes.

As long as the vehicle includes the internal combustion engine 20 and the controller 80, the vehicle may be a hybrid vehicle including a motor generator as a power source.

What is claimed is:

1. An internal combustion engine controller for an internal combustion engine, wherein the internal combustion engine includes:
- an intake passage;
- an exhaust passage; and
- an EGR device that recirculates some of exhaust gas flowing through the exhaust passage to the intake passage as EGR gas,
- the EGR device includes:
  - an EGR passage including
    - a first end connected to the exhaust passage, and
    - a second end connected to the intake passage; and
  - an EGR valve provided in the EGR passage,
- the EGR valve includes:
  - a metal valve housing in which the EGR passage is formed;
  - a valve seat provided in the metal valve housing;
  - a valve member supported by the metal valve housing so as to be movable in a separating direction away from the valve seat and an approaching direction opposite to the separating direction and approaching the valve seat; and
  - an actuator that operates to move the valve member in the separating direction and the approaching direction,
- the EGR valve is configured to
  - restrict a flow of the EGR gas in the EGR passage by pressing the valve member against the valve seat when the EGR valve is closed, and
  - allow the flow of the EGR gas in the EGR passage by separating the valve member from the valve seat when the EGR valve is opened,
- the internal combustion engine controller includes processing circuitry configured to control the EGR valve by operating the actuator, and
- the processing circuitry is configured to execute:
  - a determining process of determining whether a temperature of the internal combustion engine is substantially equal to an outside air temperature; and
  - in response to determining, in the determining process, that the temperature of the internal combustion engine is substantially equal to the outside air temperature during a stopped state of the internal combustion engine, an axis displacement eliminating process of causing the EGR valve to perform an opening/closing operation to eliminate a displacement between a central axis of the valve seat and a central axis of the valve member.

2. The internal combustion engine controller according to claim 1, wherein
- the processing circuitry is further configured to, in response to a temperature of a coolant circulating through the internal combustion engine being equal to or lower than a determination temperature in the determining process, determine that the temperature of the internal combustion engine is substantially equal to the outside air temperature.

3. The internal combustion engine controller according to claim 2, wherein
- the determination temperature increases as the outside air temperature increases.

4. The internal combustion engine controller according to claim 1, wherein
- the internal combustion engine is mounted on a vehicle, and
- the processing circuitry is further configured to, in response to an accumulated value of a traveled distance of the vehicle being equal to or greater than a determination distance, prohibit execution of the axis displacement eliminating process.

5. The internal combustion engine controller according to claim 4, wherein
- an EGR leakage amount is an amount of the EGR gas that leaks into the intake passage via the EGR valve with the internal combustion engine in the stopped state, and
- the determination distance is set as a value corresponding to a number of operations of the EGR valve at a timing at which the EGR leakage amount starts to decrease after the EGR leakage amount increases as the number of operations increases.

6. The internal combustion engine controller according to claim 1, wherein
- the processing circuitry is further configured to, in response to an accumulated value of a number of operations of the EGR valve being equal to or greater than a determination number, prohibit execution of the axis displacement eliminating process.

7. The internal combustion engine controller according to claim 1, wherein
- the processing circuitry is further configured to open and close the EGR valve once in the axis displacement eliminating process.

8. The internal combustion engine controller according to claim 1, wherein
- the processing circuitry is further configured to determine whether the temperature of the internal combustion engine has become substantially equal to the outside air temperature using a duration of a state in which the operation of the internal combustion engine is in the stopped state.

9. The internal combustion engine controller according to claim 1, wherein the processing circuitry is further configured to determine whether the axis displacement eliminating process has been executed, in response to determining that the axis displacement eliminating process has not been executed, determine whether a prohibition condition of the axis displacement eliminating process is satisfied, wherein the prohibition condition is determined to be satisfied in response to an accumulated value of a traveled distance of a vehicle mounted with the internal combustion engine being equal to or greater than a determination distance, and the prohibition condition is determined to be not satisfied in response to the accumulated value of the traveled distance being less than the determination distance, in response to determining that the prohibition condition of the axis displacement eliminating process is not satisfied, determine whether the internal combustion engine is in the stopped state, and in response to determining that the internal combustion engine is in the stopped state, execute the determining process, wherein the temperature of the internal combustion engine is determined to be substantially equal to the outside air temperature in response to a temperature of a coolant circulating through the internal combustion engine being equal to or lower than a determination temperature.

10. The internal combustion engine controller according to claim 9, wherein an EGR leakage amount is an amount of the EGR gas that leaks into the intake passage via the EGR valve with the internal combustion engine in the stopped state, the determination distance is set as a value corresponding to a number of operations of the EGR valve at a timing at which the EGR leakage amount starts to decrease after the EGR leakage amount increases as the number of operations increases, and the determination temperature increases as the outside air temperature increases.

11. The internal combustion engine controller according to claim 10, wherein the processing circuitry is further configured to determine whether the temperature of the internal combustion engine has become substantially equal to the outside air temperature using a duration of a state in which the operation of the internal combustion engine is in the stopped state.

12. The internal combustion engine controller according to claim 11, wherein the processing circuitry is further configured to open and close the EGR valve only once in the axis displacement eliminating process.

13. The internal combustion engine controller according to claim 12, wherein the processing circuitry is further configured to eliminate the displacement between the central axis of the valve seat and the central axis of the valve member due to a thermal deformation of the metal valve housing.

14. A method of controlling an internal combustion engine, wherein the internal combustion engine includes:

an intake passage;

an exhaust passage; and an EGR device that recirculates some of exhaust gas flowing through the exhaust passage to the intake passage as EGR gas, the EGR device includes:

an EGR passage including a first end connected to the exhaust passage, and a second end connected to the intake passage; and an EGR valve provided in the EGR passage, the EGR valve includes:

a metal valve housing in which the EGR passage is formed;

a valve seat provided in the metal valve housing;

a valve member supported by the metal valve housing so as to be movable in a separating direction away from the valve seat and an approaching direction opposite to the separating direction and approaching the valve seat; and an actuator that operates to move the valve member in the separating direction and the approaching direction, the EGR valve is configured to restrict a flow of the EGR gas in the EGR passage by pressing the valve member against the valve seat when the EGR valve is closed, and allow the flow of the EGR gas in the EGR passage by separating the valve member from the valve seat when the EGR valve is opened, the method comprising:

determining whether a temperature of the internal combustion engine is substantially equal to an outside air temperature; and in response to determining that the temperature of the internal combustion engine is substantially equal to the outside air temperature during a stopped state of the internal combustion engine, causing the EGR valve to perform an opening/closing operation to eliminate a displacement between a central axis of the valve seat and a central axis of the valve member.

15. The method of controlling the internal combustion engine controller according to claim 14, further comprising:

determining whether the axis displacement eliminating process has been executed, in response to determining that the axis displacement eliminating process has not been executed, determining whether a prohibition condition of the axis displacement eliminating process is satisfied, wherein the prohibition condition is determined to be satisfied in response to an accumulated value of a traveled distance of a vehicle mounted with the internal combustion engine being equal to or greater than a determination distance, and the prohibition condition is determined to be not satisfied in response to the accumulated value of the traveled distance being less than the determination distance, in response to determining that the prohibition condition of the axis displacement eliminating process is not satisfied, determining whether the internal combustion engine is in the stopped state, and in response to determining that the internal combustion engine is in the stopped state, determining whether the temperature of the internal combustion engine is substantially equal to the outside air temperature, wherein the temperature of the internal combustion engine is determined to be substantially equal to the outside air temperature in response to a temperature of a coolant circulating through the internal combustion engine being equal to or lower than a determination temperature.

16. The method of controlling the internal combustion engine controller according to claim 15, wherein an EGR leakage amount is an amount of the EGR gas that leaks into the intake passage via the EGR valve with the internal combustion engine in the stopped state, the determination distance is set as a value corresponding to a number of operations of the EGR valve at a timing at which the EGR leakage amount starts to decrease after the EGR leakage amount increases as the number of operations increases, and the determination temperature increases as the outside air temperature increases.

17. The method of controlling the internal combustion engine controller according to claim 16, wherein whether the temperature of the internal combustion engine has become substantially equal to the outside air temperature is determined by using a duration of a state in which the operation of the internal combustion engine is in the stopped state.

18. The method of controlling the internal combustion engine controller according to claim 17, wherein in said causing the EGR valve to perform the opening/closing operation, the EGR valve is opened and closed only once.

19. The method of controlling the internal combustion engine controller according to claim 18, wherein in said causing the EGR valve to perform the opening/closing operation, the displacement between the central axis of the valve seat and the central axis of the valve member due to a thermal deformation of the metal valve housing is eliminated.

* * * * *